US006724830B2

(12) United States Patent
Do et al.

(10) Patent No.: US 6,724,830 B2
(45) Date of Patent: Apr. 20, 2004

(54) HIGH EFFICIENCY LINE DRIVER FOR HIGH CREST-FACTOR SIGNALS SUCH AS DMT/ADSL SIGNALS

(75) Inventors: Gary L. Do, San Jose, CA (US); Earl W. McCune, Jr., Santa Clara, CA (US); Wendell B. Sander, Los Gatos, CA (US)

(73) Assignee: Tropian, Inc., Cupertino, CA (US)

( * ) Notice: Subject to any disclaimer, the term of this patent is extended or adjusted under 35 U.S.C. 154(b) by 298 days.

(21) Appl. No.: 09/794,542

(22) Filed: Feb. 26, 2001

(65) Prior Publication Data

US 2001/0017893 A1 Aug. 30, 2001

Related U.S. Application Data

(63) Continuation of application No. 09/419,707, filed on Oct. 14, 1999, now Pat. No. 6,567,491.

(51) Int. Cl.[7] .............................. H04L 27/49; H04B 3/00
(52) U.S. Cl. ...................................... 375/295; 375/257
(58) Field of Search ................................ 375/257, 258, 375/256, 222, 260, 295

(56) References Cited

U.S. PATENT DOCUMENTS

| 5,235,617 | A | * | 8/1993 | Mallard, Jr. ................. 375/288 |
| 5,353,309 | A | * | 10/1994 | Agazzi et al. ............... 375/295 |
| 5,465,270 | A | * | 11/1995 | Beauducel et al. .......... 375/242 |
| 5,736,950 | A | | 4/1998 | Harris et al. |
| 5,915,210 | A | | 6/1999 | Cameron et al. |

FOREIGN PATENT DOCUMENTS

EP 0840474 5/1998

OTHER PUBLICATIONS

Moyal et al. "A 25–Kft, 768–Kb/s CMOS Analog Front End for Multiple–Bit–Rate DSL Transceiver," Dec. 1999, IEEE Journ of Solid State circuit vol. 34, No. 12, pp 1961–1972.*

Chang et al. "A CMOS Analog Front–End Circuit for an FDM–Based ADSL System" IEEE Journal of Solid–State Circuits, vol. 30, No. 12, 12/95.

Michael Moyal, "Optimization and Design of Fast Transceiver for DSL Application in CMOS Technology" 0–7803–5682–3/33/$10.00©1999 IEEE.

* cited by examiner

Primary Examiner—Tesfaldet Bohure
(74) Attorney, Agent, or Firm—Thelen Reid & Priest, LLP

(57) ABSTRACT

The present invention, generally speaking, achieves a highly efficient line driver for high crest-factor signals such as DMT/ADSL signals. In an exemplary embodiment, a digital signal produced by a digital signal processor or the like is processed by a sigma-delta modulator (SDM) to produce one or more binary signal pairs. The signals of a signal pair are low-pass filtered, if necessary, and applied across the winding of a transformer. The transformer has a single secondary winding connected to the line and may has as many primary windings as the number of signal pairs. The transformer may have a unity turns ratio or may have a turns ratio for accomplishing voltage step-up. For one signal pair, the number of possible resulting signals levels on the secondary side is three, for two signal pairs five, etc. Using more than two signal levels, it becomes possible to recreate from the digital signals the corresponding analog waveform with the required accuracy. The circuit requires only a single supply voltage, is inherently balanced and provides high-voltage DC isolation.

32 Claims, 11 Drawing Sheets

US 6,724,830 B2

HIGH EFFICIENCY LINE DRIVER FOR HIGH CREST-FACTOR SIGNALS SUCH AS DMT/ADSL SIGNALS

This is a continuation of application Ser. No. 09/419,707 filed Oct. 14, 1999 now U.S. Pat. No. 6,576,491 issued May 20, 2003.

BACKGROUND OF THE INVENTION

1. Field of the Invention

The present invention relates to line drivers for high-speed digital communications.

2. State of the Art

Broadband communications solutions, such as ADSL (Asynchronous Digital Subscriber Line) are increasingly in demand. The ability to achieve high data rates (e.g., 1 Mbps and above) between customer premises and the telephone system central office over existing (unconditioned) telephone lines poses a considerable technical challenge. ADSL is simply one example of a class of communications techniques generally known as Discrete Multitone (DMT). In DMT, a broad band of spectrum is divided into potentially a large number of sub-bands having a particular center frequency (tone). Conceptually, a digital communications signal is sent within each sub-band, all of the sub-band signals being added together to form a single complex signal. Referring to FIG. 1, in the specific case of ADSL, about 250 discrete tones are placed within a band from about 0.1 to 1.2 MHz (above the voice band, or POTS region), with information being modulated on each tone. Using such an arrangement, a combined bandwidth of up to 8 Mbps can be achieved.

An ADSL signal presents special problems for circuit designers because of its large "crest factor," defined as the ratio of the peak signal voltage to the average signal voltage. For ADSL, the crest factor is typically about 5.6. This high crest factor is accounted for by noting that, whereas the discrete multitone signals comprising an ADSL signal usually sum together to a relatively low average value, occasionally, the signals align in such as way as to sum together to a relatively high peak value. A typical ADSL signal might appear as shown in FIG. 2, for example, characterized by a high peak value, Vpk, and a low average value, Valve. The signal is produced by a digital signal processor (DSP) in the form of a digital signal having a sample rate in the range of about 3 to 5 MHz. (Also identified in FIG. 2 are voltage levels $Vs_1$ and $Vs_2$, referenced in the description that follows.)

FIG. 3 shows a first example of a prior-art ADSL line driver circuit. An 8 Mbps information stream is input to a DSP, which produces a complex modulated signal in the form of samples (e.g., 12 bit) at the aforementioned sample rate. The samples are converted to analog and the resulting signal low-pass filtered to produce a transmission signal. The transmission signal is applied to a linear (e.g., Class A) power amplifier. Typically, the amplifier operates from ±15V power supplies and receives about 10 W of power. About 9.9 W of power are dissipated within the amplifier, while about 0.1 W of power is output through an isolation transformer to the phone line.

Because of the power consumption and heat dissipation of the circuit of FIG. 3, only a few hundred such line drivers can be accommodated within a typical central office of the telephone system. That is, only a very small percentage of the subscriber's serviced by the central office can be provided with broadband service without rebuilding or reconfiguring the central office (to allow for the removal of heat), which besides being very expensive is often not feasible.

FIG. 4 shows an improved prior-art ADSL line driver circuit. This circuit differs from that of FIG. 3 in that a "Class G" amplifier is used, comprising the usual Class A amplifier in combination with a switchable power supply. During normal operation, a supply voltage select circuit is set to apply a lower supply voltage $Vs_2$, say ±5V, to the amplifier. When greater signal range is required, the DSP produces a control signal PK that sets the supply voltage select circuit is set to apply a higher supply voltage $Vs_1$ (e.g., ±15V) to the amplifier. The Class G amplifier dissipates about 3 W, as compared to almost 10 W in the original approach.

While the circuit of FIG. 4 provides a substantial improvement over the circuit of FIG. 3, the underlying problems of excessive power consumption, excessive heat dissipation, and low efficiency remain to a large degree. Substantial further improvements in power efficiency (10× or more, if possible) are desired.

Because of the linearity requirements of DMT/ADSL signals, circuits used heretofore for DMT/ADSL line drivers have been linear circuits. Other existing non-linear, switch-mode circuits have generally not been considered for this purpose. One such circuit is the sigma-delta modulator. Sigma-delta modulators are widely used for data conversion. A sigma-delta converter modulates a varying-amplitude analog input signal into a simple digital code at a frequency much higher than the Nyquist rate.

Another non-linear prior-art circuit is the Class D amplifier, most commonly used for audio applications. In a Class D amplifier, an input signal (typically an audio signal) is transformed into an output signal capable of being reproduced into the original signal on an external load, usually a speaker. In the basic operation of a Class D amplifier, an incoming signal is converted by a pulse-width modulator into a high-frequency rectangular wave, the average value of which tracks the original signal. The rectangular wave is fed into an output stage which provides level shifting and splits the signal into a driving signal high/low driving signals. The driving signals are filtered to remove switching noise, providing an averaged output to drive a load such as a speaker. Within the output stage, however, the high/low signals result in significant distortion due to imperfectly matched components. More particularly, pulses produced by pull-up and pull-down transistors, respectively, exhibit substantially different shapes. Such distortion is unacceptable in applications such as ADSL.

There remains a need for a line driver circuit for high crest-factor signals such as DMT/ADSL signals that consumes less power, dissipates less heat and is more efficient.

SUMMARY OF THE INVENTION

The present invention, generally speaking, achieves a highly efficient line driver for high crest-factor signals such as DMT/ADSL signals. In an exemplary embodiment, a digital signal produced by a digital signal processor or the like is processed by a sigma-delta modulator (SDM) to produce one or more binary signal pairs. The signals of a signal pair are low-pass filtered, if necessary, and applied across the winding of a transformer. The transformer has a single secondary winding connected to the line and may has as many primary windings as the number of signal pairs. The transformer may have a unity turns ratio or may have a turns ratio for accomplishing voltage step-up. For one signal pair, the number of possible resulting signals levels on the secondary side is three, for two signal pairs five, etc. Using more than two signal levels, it becomes possible to recreate from the digital signals the corresponding analog waveform with the required accuracy. The circuit requires only a single supply voltage, is inherently balanced and provides high-voltage DC isolation.

BRIEF DESCRIPTION OF THE DRAWING

The present invention may be further understood from the following description in conjunction with the appended drawing. In the drawing.

DETAILED DESCRIPTION OF THE PREFERRED EMBODIMENTS

Figure 5:
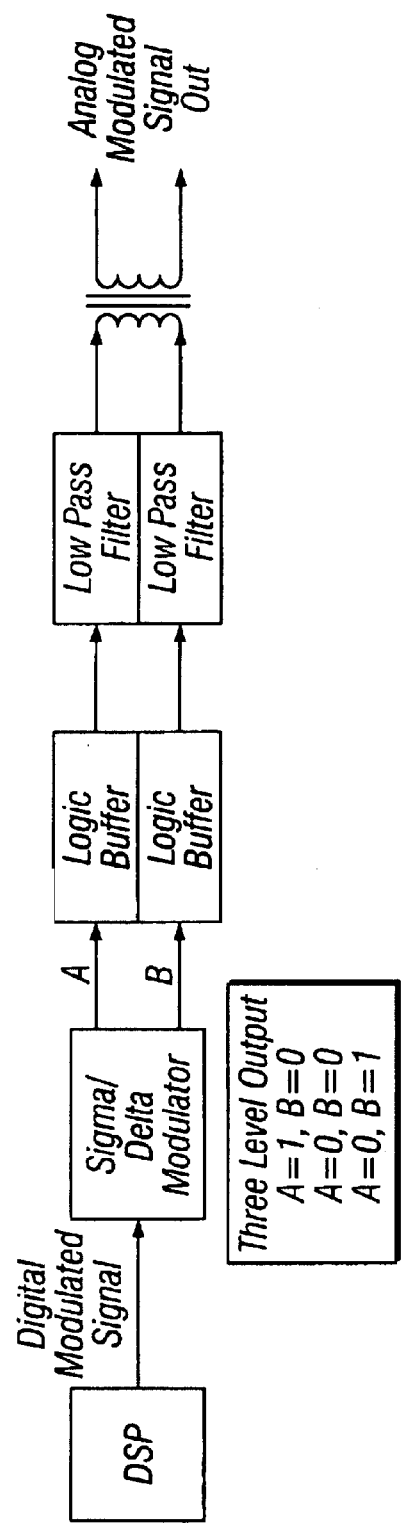
FIG. 5 is circuit diagram of one embodiment of an ADSL driver in accordance with present invention.

Referring now to FIG. 5, a block diagram is shown of a line driver circuit in accordance with an exemplary embodiment of the present invention. A digital signal processor or the like produces a signal composed of digital samples of a high crest-factor, e.g., DMT/ADSL, communications signal. The communications signal is input to a sigma-delta modulator. Preferably, the sigma-delta modulator is second order or higher.

The sigma-delta modulator produces one or more pairs of digital output signals. In the example of FIG. 5, the sigma-delta modulator produces a single pair of digital output signals, signals A and B. Two signals yield four possible logic combinations. One of these combinations, however, is redundant. That is, the effect of a 11 logic combination is the same as the effect of a 00 logic combination. The circuit of FIG. 5 is therefore described as a three-level ADSL driver, with the logic combinations corresponding to the different levels as shown. The digital output signals are buffered in respective logic buffers and filtered, if necessary, using respective low-pass filters to remove switching noise caused by the sigma-delta modulator. The pair of digital output signals is then applied across a primary winding of a transformer. In an exemplary embodiment, the transformer is a 1:2 transformer having a primary winding of some number of turns and a secondary winding having twice the number of turns. In general, the turns ratio is set so as to achieve a desired output level on the communications line, having a standard 120 ohm impedance, for example.

Figure 6:
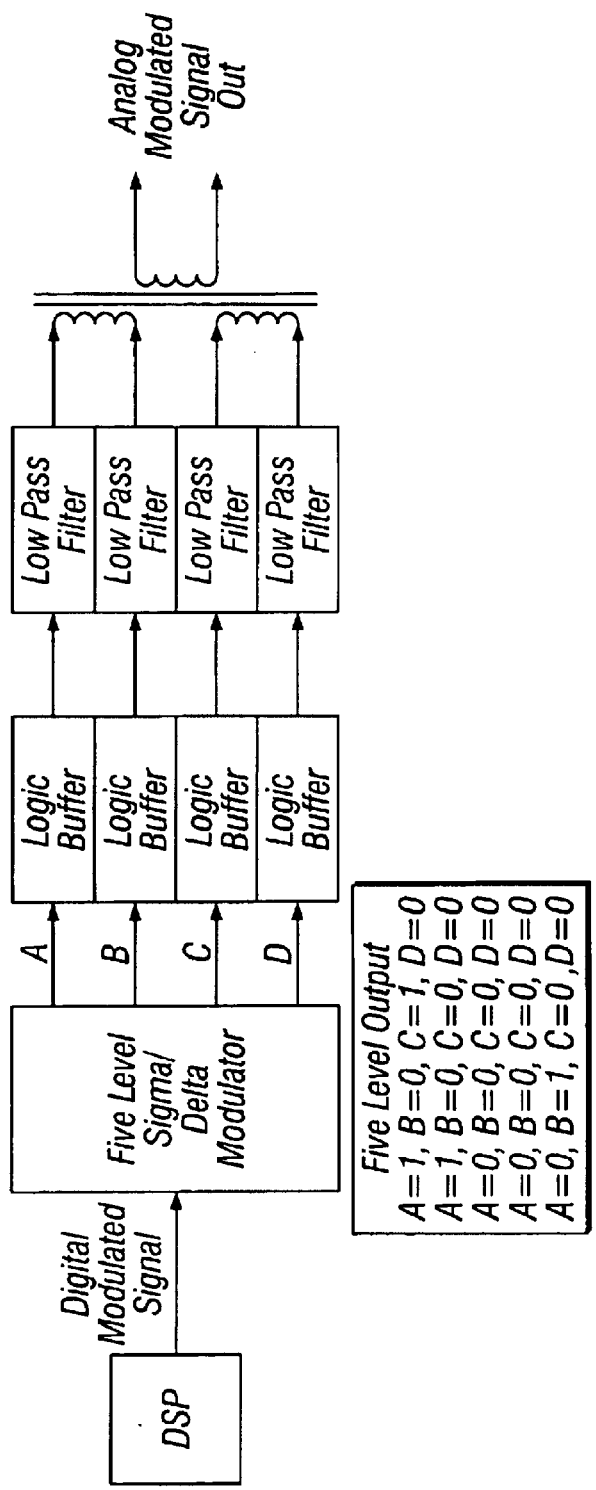
FIG. 6 is a circuit diagram of another embodiment of an ADSL driver in accordance with the present invention.

FIG. 6 shows a five level ADSL driver in which the sigma delta modulator produces two pairs of signals, AB and CD. Although circuits having a still greater number of levels are readily achievable, five levels has been found to be sufficient for purposes of the present ADSL standard. After buffering and filtering, each pair of digital output signals is then applied across a primary winding of a transformer. In an exemplary embodiment, the transformer is a transformer having a first primary winding of some number of turns, a second primary winding of the same number of turns, and a secondary winding having twice the number of turns. The output signal induced in the secondary winding is the result of superposition of the signals in the first and second primary windings. That is, the first and second pairs of signals are summed in the transformer.

Figure 7:
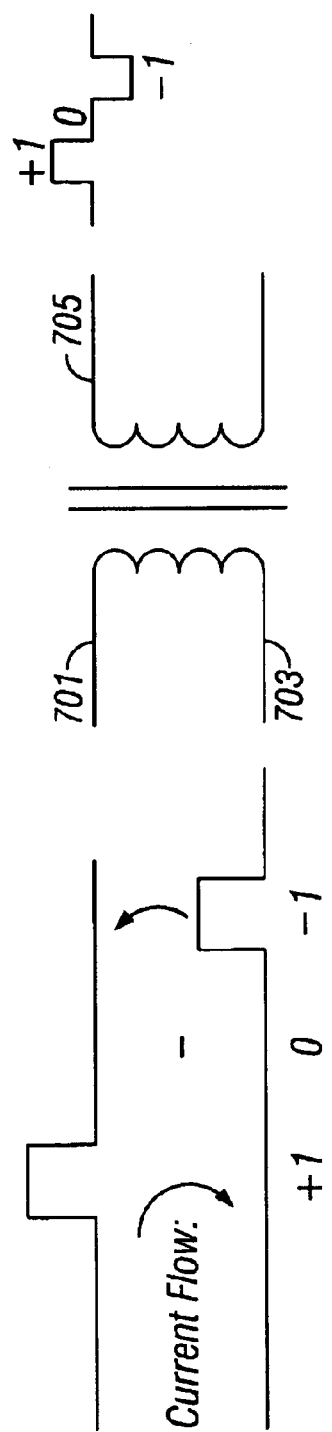
FIG. 7 is a diagram illustrating multiple signal levels produced in response to different logical combinations of signals of a binary signal pair.

Referring to FIG. 7, the effect of applying to a primary winding a pair of digital output signals consisting of offset positive-going pulses is shown. During a first interval, the positive-going pulse at terminal 701 of the primary produces a positive-going pulse at terminal 705 of the secondary. During a second intervening time interval between the two pulses, the terminals 701 and 703 of the primary are at the same voltage level with the result that no current flows through the primary and no voltage is produced in the secondary. During a third time interval, the positive-going pulse at terminal 703 of the primary produces a negative-going pulse at terminal 705 of the secondary. The three resulting voltage levels produced at terminal 705 of the secondary are voltages corresponding to weights of +1, 0 and −1, respectively.

When multiple primary windings are coupled to a single secondary winding, a signal summation occurs. A plus 1 and a plus 1 sum to a plus 2. Likewise, a minus 1 and a minus 1 sum to a minus 2. Possible outputs on the secondary side therefore include −2, −1, 0, +1 and +2. The task of the sigma delta modulator is to apply a sequence of these possible outputs to be applied to the primary in such a way as to reproduce the digital input signal.

Figure 8:
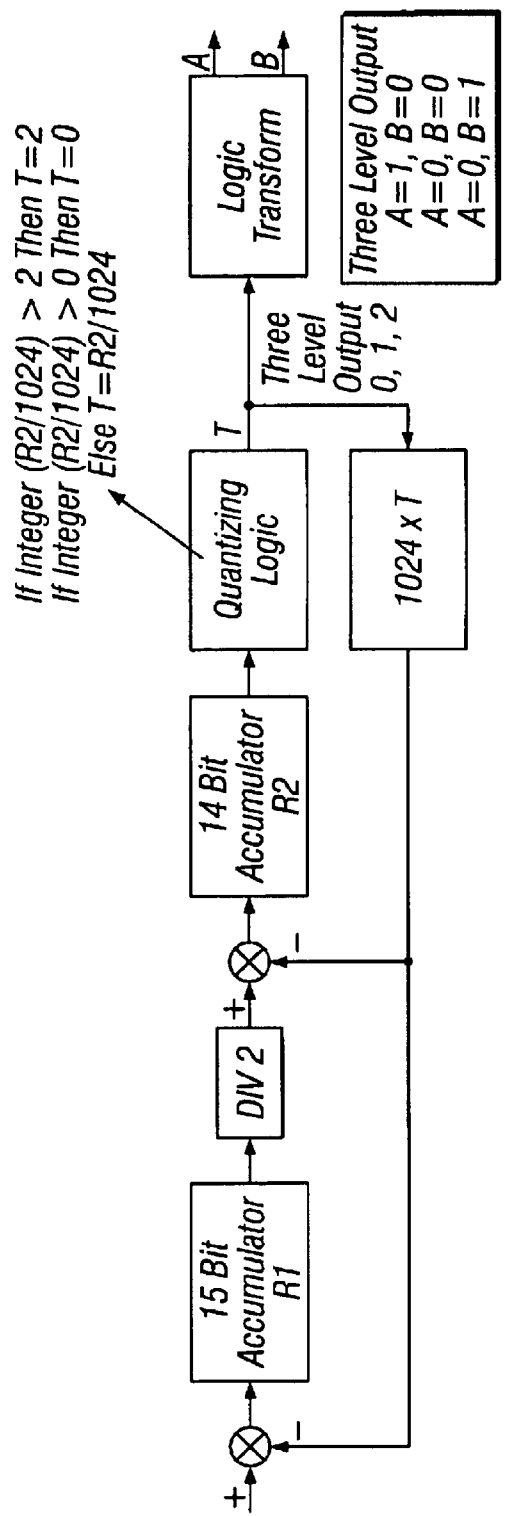
FIG. 8 is a block diagram of one embodiment of a sigma-delta modulator that can be used with the present invention.

An example of a sigma delta modulator for performing the foregoing function is shown in FIG. 8 for the three-level case. The sigma delta modulator is second order, although higher orders can be used. Within the feedforward path, there are a first summer, a first accumulator R1 (e.g., 15-bit), a divide-by-two block, a second summer, a second accumulator R2 (e.g., 14-bit), and quantizing logic. The quantizing logic divides the contents of the accumulator R2 by 1024. The result may range from −1 to 3. If the result is greater than two, then the quantizing logic outputs the value 2. If the result is negative, then the quantizing logic outputs a zero value. Otherwise, the quantizing logic outputs the contents of the accumulator R2. The resulting output signal T of the quantizing logic is a three level output signal having the possible levels 0, 1 and 2.

In the feedback path, the signal T is multiplied by 1024 and the result applied to the negative input of the first and second summers.

The signal T is applied to a logic transform block. The logic transform block is responsive to the three-level signal to produce a corresponding signal pair AB to be applied to the transformer primary.

Figure 9:
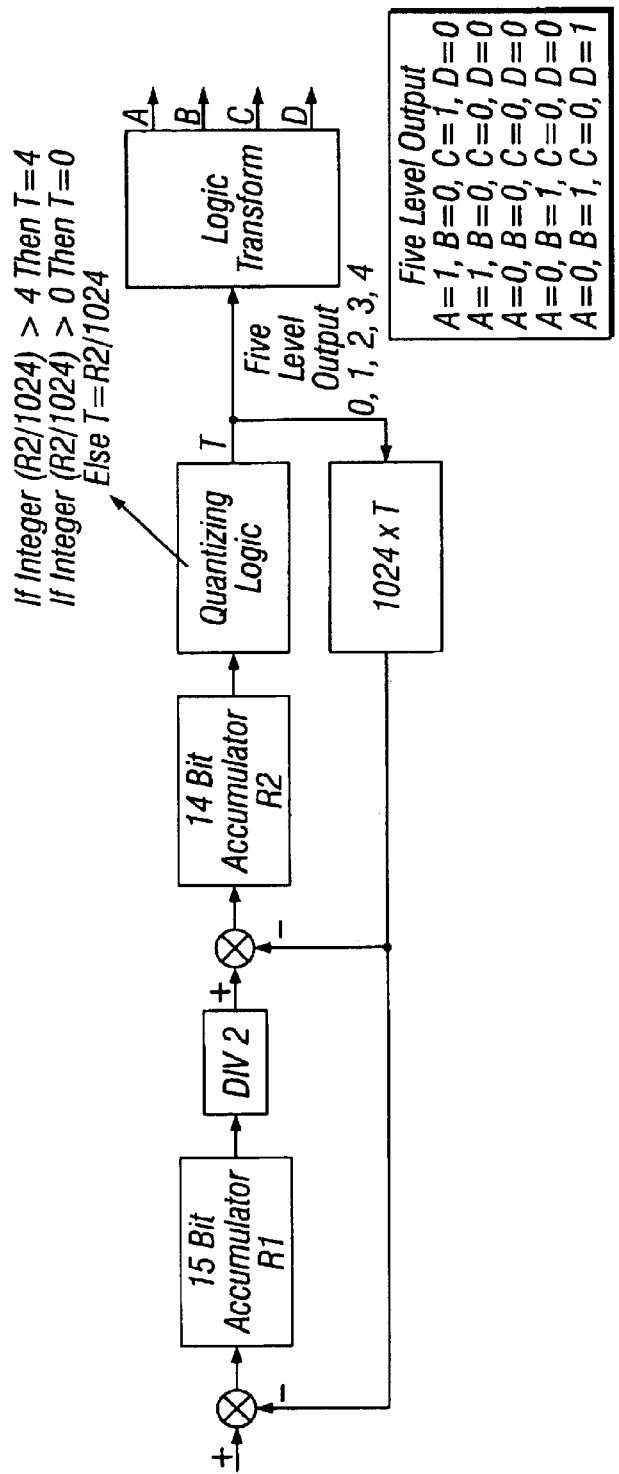
FIG. 9 is a block diagram of another embodiment of a sigma-delta modulator that can be used with the present invention.

FIG. 9 shows the corresponding circuit for the five-level case. In the five-level case, the quantizing logic produces an output signal T having five possible levels, 0, 1, 2, 3, and 4. In particular, the quantizing logic divides the contents of the accumulator R2 by 1024. The result may range from −1 to 6. If the result is greater than four, then the quantizing logic outputs the value 2. If the result is negative, then the quantizing logic outputs a zero value. Otherwise, the quantizing logic outputs the contents of the accumulator R2. The resulting output signal T of the quantizing logic is a five-level output signal having the possible levels 0, 1, 2, 3 and 4.

The signal T is applied to a logic transform block. The logic transform block is responsive to the five-level signal to produce two corresponding signal pairs AB and CD to be applied to respective transformer primary windings.

The circuits of FIG. 5 and FIG. 6, or circuits of the type shown in FIG. 5 and FIG. 6, have several desirable properties. Unlike prior art circuits, circuits of this type require only a single power supply. A supply voltage in the range of 5–10V is sufficient, especially given the availability of voltage step-up through the transformer. The transformer provides high-voltage DC isolation, a requirement in any case. Whereas prior-art circuits use a transformer expressly for that purpose, in the circuits of FIG. 5 and FIG. 6, the transformer is needed for the summation function but additionally provides the needed isolation. Another important advantage of the circuits of FIG. 5 and FIG. 6 is that the circuit is inherently balanced. That is, a −1 is produced by a positive-going pulse just as is a +1. The switches used to produce the respective pulses may therefore be very closely matched. This inherent balance avoids the asymmetry problem experienced in Class D amplifier circuits, for example.

Figure 1:
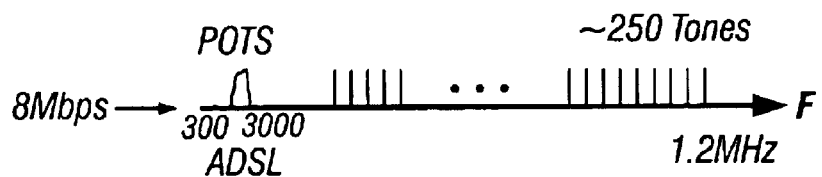
FIG. 1 is a diagram showing the spectrum occupied by an ADSL signal.
Figure 2:
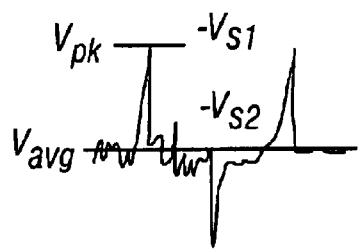
FIG. 2 is an exemplary waveform diagram of an ADSL signal.
Figure 3:
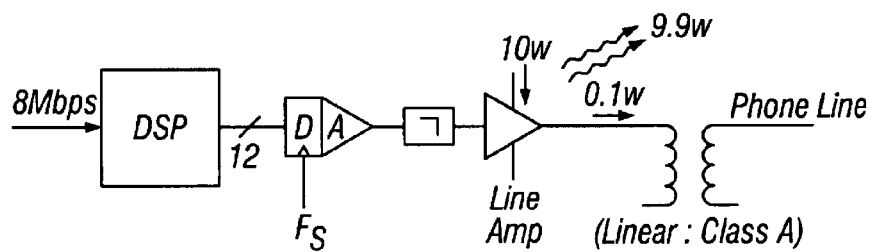
FIG. 3 is a circuit diagram of a prior art ADSL driver.
Figure 4:
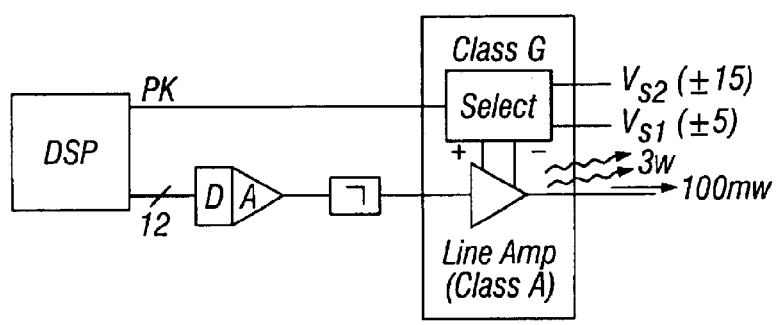
FIG. 4 is a circuit diagram of an improved prior art ADSL driver.

Most notably, since the sigma-delta modulator approach uses low-loss switches, it dissipates approximately a factor of six less power than the prior art circuit of FIG. 4, an estimated 0.5 W as compared to 3 W. As a result, a central office can be expected to accommodate six times as many line drivers, enabling demand to be more readily satisfied.

It has been found that a higher-order SDM modulator may be used to increase noise performance, at the cost of increased complexity. A fifth-order SDM, various constructions of which are known in the art, is presently preferred. The order of SDM used has implications also for the low-pass filters used. In general, it has been found in practice that good performance is obtained when the order of the low-pass filter is commensurate with that of the SDM; e.g., a third-order SDM would call for a third-order LPF, and fifth-order SDM would call for a fifth-order LPF, etc.

Various further details of the present line driver will now be described. In the following description, a change of notation is adopted for convenience. Whereas in the foregoing description the outputs of the SDM were shown as being coded to produce signals A, B, C and D, in the following description, the corresponding signals are designated $A_1$, $B_1$, $A_2$ and $B_2$, with "A" signals being applied to pull-up switches and "B" signals being applied to pull-down switches as will become apparent. In the following description, switches referred to in accordance with the designation of the control signal used to control that switch (e.g., switches $A_1'$, $B_1'$, $A_2'$ and $B_2'$ corresponding to control signals $A_1'$, $B_1'$, $A_2'$ and $B_2'$, the latter being derived in turn from signals $A_1$, $B_1$, $A_2$ and $B_2$ produced by the SDM).

Figure 10:
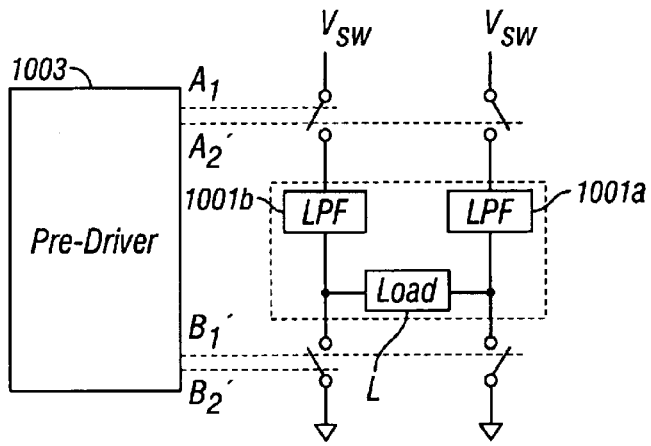
FIG. 10 is a diagram of a driver structure that may be used to form the logic buffers of FIG. 5.

Referring to FIG. 10, the basic structure of the logic buffers of FIG. 5 and FIG. 6, taken collectively, may be described as a "semi-differential" H driver structure. A load device L (such as a transformer) forms the horizontal member of the H, and respective low pass filters (1001a, 1001b) are connected just above the vertices of the H. The load device and the low pass filters are enclosed in dashed lines, since they are separate from the logic buffers. On each side of the H, one switch is located in the upper portion of the vertical member of the H, and one switch is located in the lower portion of the same. Whereas the upper switch connects a side of the load to an operational voltage, $V_{SW}$, the lower switch connects that side of the load to a reference voltage, i.e., ground. The switches are controlled by respective drive signals produced by a pre-driver 1003 described hereinafter.

The H structure is semi-differential in the sense that a voltage produced across the load at a given instant is a function of two input signals; however, constraints apply to which two input signals may be applied at a given time. In particular, in the example of FIG. 10, allowable input signal pairs are determined in accordance with which switches may be closed simultaneously, namely: (A1',B2'); (A2',B1'); and (B1',B2'), defining respective states. In the first state, current is driven through the load in one direction; in the second state, current is driven through the load in the opposite direction; and in the third state, no current is driven through the load.

Figure 11:
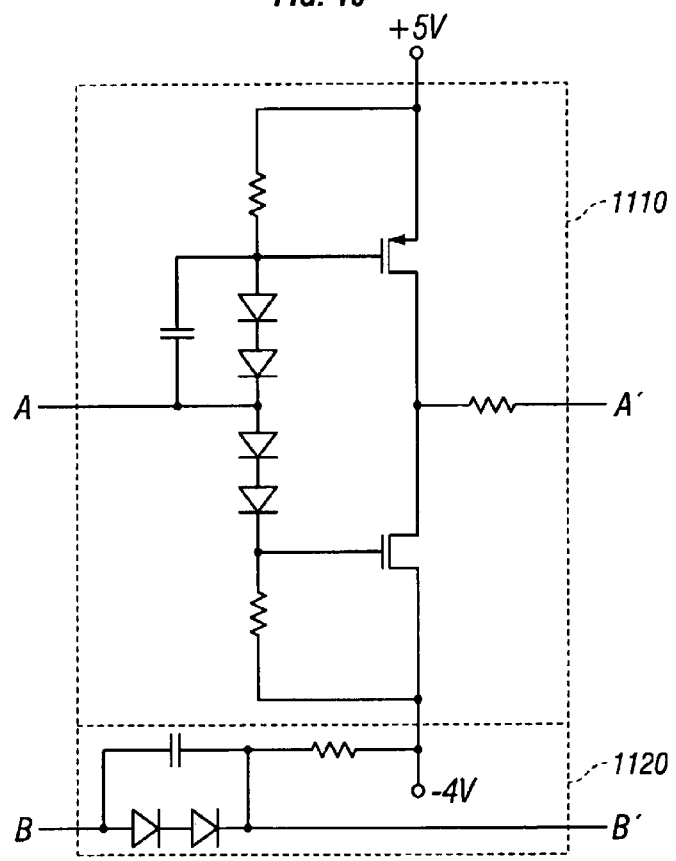
FIG. 11 is a diagram of a pre-driver (level-shifter) circuit that may be used with the driver structure of FIG. 10.

Referring to FIG. 11, an example is shown of one suitable pre-driver circuit that may be used with the driver of FIG. 10. The pre-driver primarily performs a level-shifting function, converting standard logic signals into suitable drive signals for the power switches. The pre-driver consists of two portions, one portion 1110 that receives a control signal A and produces an appropriately level-shifted signal A', and another portion 1120 that receives a control signal B and produces an appropriately level-shifted signal B'. In an exemplary embodiment, the steady-state levels of the signals A and B are about 0V and 4V, the steady-state levels of the signal A' are about −4V and +5V, and the steady-state levels of the signal B' are about −4V and 0V. When the signal B is high, the signal B' is likewise high, and vice versa. With regard to signal A, however, an inversion occurs due to the totem-pole configuration of the pre-driver transistors, such that when the signal A is high, the signal A' is low, and vice versa.

For the H driver structure of FIG. 10, two pre-driver (level-shifter) circuits such as that of FIG. 11 are provided, one that receives input signals $A_1$ and $B_1$ and produces output signals $A_1'$ and $B_1'$, and another that receives input signals $A_2$ and $B_2$ and produces output signals $A_2'$ and $B_2'$.

The H driver structure as shown may be used to realize a line driver having a three-level SDM like that of FIG. 5, in accordance with the following truth table, where for the A' and B' signals, 1 represents a high condition (ON) and 0 represents a low (OFF) condition:

TABLE 1

|    | $A_1'$ | $A_2'$ | $B_1'$ | $B_2'$ |
|----|--------|--------|--------|--------|
| 1  | 1      | 0      | 1      | 0      |
| 0  | 0      | 0      | 1      | 1      |
| −1 | 0      | 1      | 0      | 1      |

To realize a line driver having a five-level SDM like that of FIG. 6, the H driver structure may be duplicated, with levels being combined in the transformer in the manner of FIG. 6. The following truth table results:

TABLE 2

|    | $A_1'$ | $A_2'$ | $B_1'$ | $B_2'$ | $A_3'$ | $A_4'$ | $B_3'$ | $B_4'$ |
|----|--------|--------|--------|--------|--------|--------|--------|--------|
| 1  | 1      | 0      | 1      | 0      | 0      | 0      | 1      | 1      |
| 0  | 0      | 0      | 1      | 1      | 0      | 0      | 1      | 1      |
| -1 | 0      | 1      | 0      | 1      | 0      | 0      | 1      | 1      |
| 2  | 1      | 0      | 1      | 0      | 1      | 0      | 1      | 0      |
| -2 | 0      | 1      | 0      | 1      | 0      | 1      | 0      | 1      |

Figure 12:
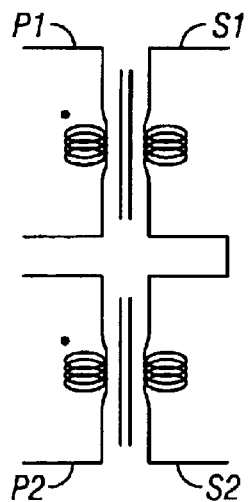
FIG. 12 is a diagram of an alternative transformer structure.

Because of the complexities of transformers, however, the configuration of FIG. 6, showing multiple primary windings and a single secondary winding all sharing a common core may not be optimal. An alternative configuration is shown in FIG. 12, in which separate transformers (P1, S1; P2, S2) are provided having their secondary windings (S1, S2) connected in series. Unintended coupling effects are thereby avoided.

Figure 13:
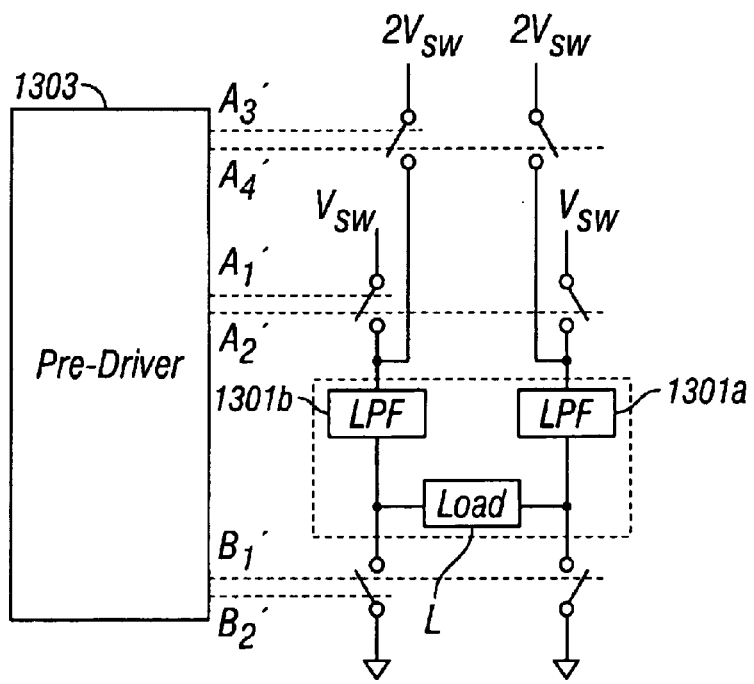
FIG. 13 is a diagram of a modified driver structure that may be used with a five-level SDM and a conventional transformer.

In accordance with yet another alternative, multiple positive supply voltages are used together with a transformer having a single primary winding and a single secondary winding, using a driver structure shown in FIG. 13. In this embodiment, two additional switches A3' and A4 are provided as compared to the H driver of FIG. 10, in correspondence to switches A1' and A2', respectively. These newly-provided pull-up switches pull up the same nodes as switches A1' and A2'; however, instead of being connected to the voltage $V_{SW}$, the newly-provided pull-up switches are connected to a voltage $2V_{SW}$.

The following table shows the desired output state of each of the switch control signals for each output signal (−2, −1, 0, 1, 2) of a sigma-delta modulator like that of FIG. 6:

TABLE 3

|    | $A_1'$ | $A_2'$ | $B_1'$ | $B_2'$ | $A_3'$ | $A_4'$ |
|----|--------|--------|--------|--------|--------|--------|
| 1  | 1      | 0      | 1      | 0      | 0      | 0      |
| 0  | 0      | 0      | 1      | 1      | 0      | 0      |
| -1 | 0      | 1      | 0      | 1      | 0      | 0      |
| 2  | 0      | 0      | 1      | 0      | 1      | 0      |
| -2 | 0      | 0      | 0      | 1      | 0      | 1      |

Figure 14:
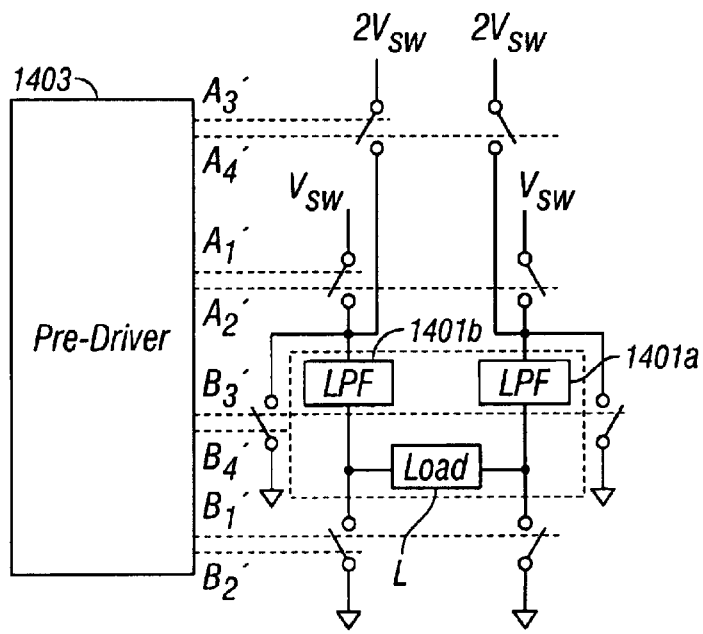
FIG. 14 is a diagram of a further modified driver structure.

In practice, it may be desirable to provide additional switches. For example, where a low-pass filter is connected to pull-up switches, if this node is allowed to float when the pull-up switches are both open, ringing (due to impedance mismatch) is liable result. Such ringing may be prevented by providing an additional switch to ground at this point, the switch being closed when the pull-up switches are both open. This modification is illustrated in FIG. 14, showing switches B3' and B4'. In one embodiment, these switches are closed only when the SDM outputs a 0 value, and are controlled through a combination of a control signal produced by the SDM and the sign bit of the previous DSP sample.

More particularly, in an exemplary embodiment, the following truth table applies:

TABLE 4

|    | $A_1'$ | $A_2'$ | $B_1'$ | $B_2'$ | $A_3'$ | $A_4'$ | $B_3'$ | $B_4'$ |
|----|--------|--------|--------|--------|--------|--------|--------|--------|
| 1  | 1      | 0      | 1      | 0      | 0      | 0      | 0      | 0      |
| 0  | 0      | 0      | 1      | 1      | 0      | 0      | 1      | 1      |

TABLE 4-continued

|    | $A_1'$ | $A_2'$ | $B_1'$ | $B_2'$ | $A_3'$ | $A_4'$ | $B_3'$ (conditionally) | $B_4'$ (conditionally) |
|----|--------|--------|--------|--------|--------|--------|------------------------|------------------------|
| -1 | 0      | 1      | 0      | 1      | 0      | 0      | 0                      | 0                      |
| 2  | 0      | 0      | 1      | 0      | 1      | 0      | 0                      | 0                      |
| -2 | 0      | 0      | 0      | 1      | 0      | 1      | 0                      | 0                      |

When the SDM output a 0 value, the values of B3' and B4' are conditioned on the value of the sign bit of the previous DSP sample. Assume a convention in which, in order to create positive-valued signals at the load, the signals A2' and A4' are pulsed. Then, in the case of B3', for it to be a 1 value, the sign bit of the previous DSP sample must have been 0, indicating a positive value. If instead the sign bit of the previous DSP sample was 1 (indicating a negative value, then the value of B3' is changed to zero with the result that the switch B3', instead of being closed, is opened. In the case of B4', for it to be a 1 value, the sign bit of the previous DSP sample must have been 1, indicating a negative value. If instead the sign bit of the previous DSP sample was 0 (indicating a positive value), then the value of B4' is changed to zero with the result that the switch B4', instead of being closed, is opened.

The conditions imposed on switches B3', and B4' may be illustrated using the following signal conditions.

A positive-value DSP sample sequence is presented to the SDM, which in response creates an oversampled sequence consisting of the output levels (+1, +2 and 0). As previously described, for a +1-level, switches A2' and B2' are closed while all other switches are open; similarly for a +2-level, switches A4' and B2' are closed while the remaining switches are open.

Under the scenario of switch positions explained in the previous paragraph, current flows from the supply-rail to ground through the LPF(1601*a*) and the load (L). When SDM output-level 0 is reached, switch B1' closes while switches A2' and A4' open, thus allowing the transformer's primary winding to discharge to ground. To minimize voltage spikes at the LPF(1601*a*) input, the driver impedance presented to this LPF must be maintained during the transition. This is achieved by closing switch B3'. Switch B4' specifically remains open to avoid ground loop current in the LPF(1601*b*), which can develop hazardous voltage spikes when switch B3' transitions from CLOSE to OPEN and when either of switches A1' or A3' transition from OPEN to CLOSE.

When a 0-level is reached from a previous negative-value DSP sample, Switch B4' is closed to match the LPF(1601*b*) input impedance and switch B3' is OPEN to avoid ground loop currents around LPF(1601*a*).

It has been found that, in order to adequately produce an xDSL signal, the power switches should have rise and fall times of less than about 2 ns at a current of about 1 A. It has further been found that, if the device used for the power switches is judiciously chosen, considerable simplification may be achieved. The device presently preferred is a MESFET (Metal-Epitaxy-Semiconductor Field-Effect Transistor). The gate capacitance of a MESFET is very low compared to other devices, thereby allowing the device to achieve very fast rise and fall times using relatively small drive signals.

Figure 15:
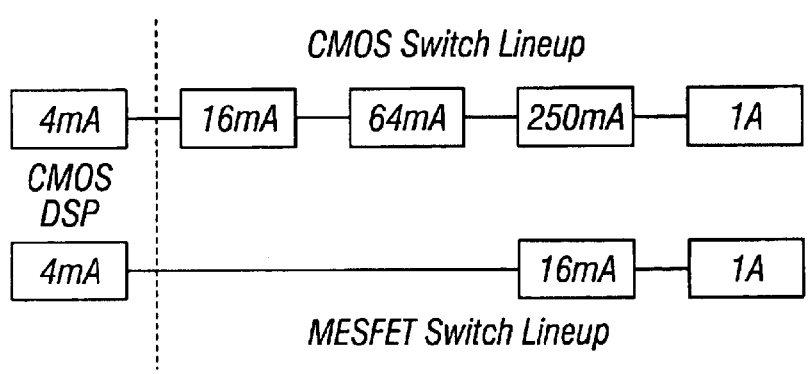
FIG. 15 is a diagram showing drive chains for examples of two different technologies.

Referring to FIG. 15, a comparison is shown of two possible different drive chains for driving the power switches, one using CMOS devices and the other using MESFET devices. A single stage, either CMOS or MESFET, may be expected to achieve current gain of about four. However, whereas a CMOS device, with its large gate capacitance, may require a drive signal of about 250 mA to achieve an output current of 1 A, a MESFET device, with its small gate capacitance, may require a drive signal of only 16 mA. Hence, assuming a CMOS logic signal of about 4 mA drive strength (as from a CMOS DSP, for example), a CMOS drive chain requires four stages (counting the power switch as the final stage), while a MESFET drive chain requires two stages. By using MESFET or similar devices, considerable simplification is achieved.

Figure 16:
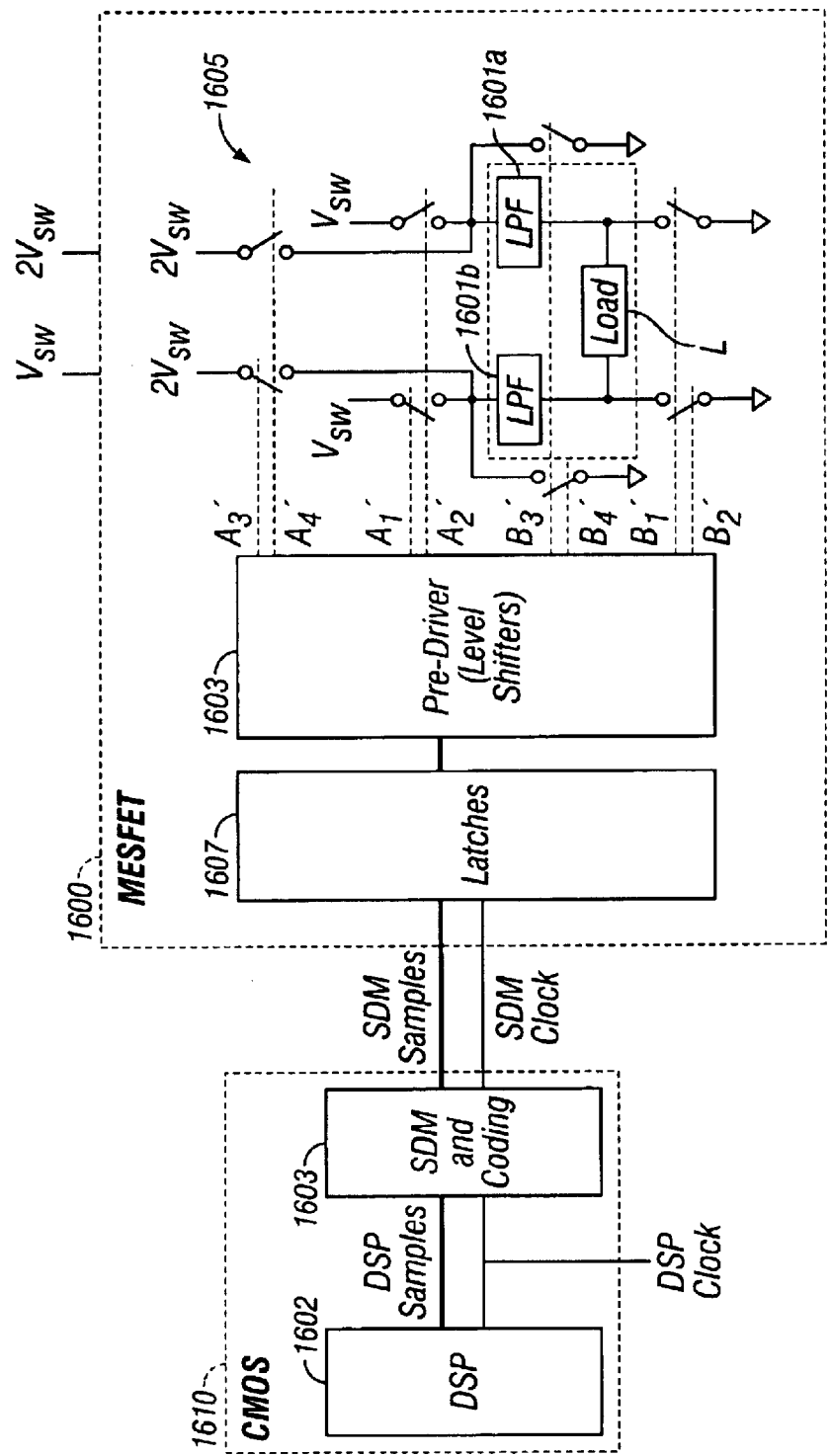
FIG. 16 is a diagram of an xDSL line driver in accordance with a preferred embodiment of the invention.

Referring now to FIG. 16, a block diagram is shown of an xDSL line driver in accordance with a preferred embodiment of the invention. The line driver may be realized in the form of a two-chip chipset, including a logic chip (e.g., CMOS chip) 1610 and a switch array chip (e.g., MESFET chip) 1600. The CMOS chip includes a DSP 1602 for performing signal synthesis and a sigma-delta modulator (SDM) 1603 or the like for performing data conversion and switch driver functions. The DSP and the SDM may run off a common clock signal. A data bus conveys digital samples of some number of bits (e.g., 16) from the DSP to the SDM. The SDM, together with associated logic, outputs a group of digital control signals, one for each power switch, at a sample clock rate (typically many times greater than the clock rate of the DSP). The MESFET chip includes primarily a switch array 1605, together with associated level shifters 1603 and latches 1607. (Low-pass filters and a transformer load are situated off-chip and are therefore enclosed in dashed lines.) In the switch array of the illustrated embodiment, four upper switch and four lower switches are provided, connected as described previously. Supply voltages $V_{SW}$ and $2V_{SW}$ are connected to selected ones of the power switches and to the level shifters.

In operation, at every sample clock, a group of control signals for the power switches is latched into the latches from the SDM. These control signals are level-shifted appropriately and applied to the power switches of the switch array to drive current at either of two drive strengths in either direction through the load, or to cease driving current through the load. As these actions are performed rapidly in the appropriate sequence as determined by the SDM, the desired waveform is created on the line.

The high efficiencies achievable using the foregoing architecture obviate the need for such conventional efficiency-enhancing measures as active output impedance control, which adds significant complexity and raises issues with respect to dynamic stability.

Thus, there has been described a line driver for high speed data communications, applicable to xDSL, among other applications, that achieves substantial efficiencies in power, size and cost. Power efficiency is achieved through the use of switch-mode techniques. Increases in power efficiency are sufficient to enable substantial increases in line density of central office equipment (raising the possibility of every line being xDSL enabled), and to enable customer-premises equipment to be powered by the telephone line rather than separately powered. Size and cost efficiency may achieved by realizing the line driver in the form of a two-chip chipset, including a logic (e.g., CMOS) chip that performs most of the required functions and a switch-array chip (e.g., MESFET). No linear active components are required.

Although the present invention has been described principally in relation to xDSL, the same principles are equally applicable to other variations of wireline communications such as cable. Furthermore, the same principles may be applied also to wireless communications, where, for example, an inductor takes the place of the transformer primary and is connected to an antenna. For example, a DMT signal is essential an OFDM (orthogonal frequency division multiplex) signal, proposed as a 4 G wireless signalling method. Similar techniques as those described could be used to produce such a wireless signal.

It will be appreciated by those of ordinary skill in the art that the invention can be embodied in other specific forms without departing from the spirit or essential character thereof. The presently disclosed embodiments are therefore considered in all respects to be illustrative and not restrictive. The scope of the invention is indicated by the appended claims rather than the foregoing description, and all changes which come within the meaning and range of equivalents thereof are intended to be embraced therein.

What is claimed is:

1. A method of generating a communications signal, comprising:
    forming a representation of a signal containing multiple discrete tones, different tones each bearing digital information of a certain information rate;
    decomposing the signal representation into multiple binary signals each having a small number of discrete values and each having a substantially greater time resolution than said information rate; and
    recomposing the multiple binary signals to produce in analog form the desired signal by driving multiple switches into a common load.

2. The method of claim 1, wherein the multiple switches are Field-Effect Transistors.

3. The method of claim 2, wherein the multiple switches are Metal-Epitaxy-Semiconductor Field-Effect Transistors.

4. The method of claim 1, wherein the common load is a line transformer.

5. The method of claim 1, further comprising filtering output signals of the multiple switches prior to applying them to the common load.

6. The method of claim 5, wherein said filtering is low-pass filtering.

7. A two-chip chipset for xDSL communications, comprising: a first digital chip comprising a processor and data modulation logic, the first chip producing multiple logic signals; and a second chip comprising multiple power switches responsive to the logic signals and producing multiple drive signals for driving a communications line.

8. Circuitry for communications signalling, comprising: a processor for producing signal samples representing a desired communications signal; data modulation logic, coupled to the processor and responsive to signal samples, for producing multiple logic signals; and multiple power switches responsive to the logic signals and producing multiple drive signals for energizing a communications medium to produce the desired communications signal.

9. The apparatus of claim 8, wherein the processor is a digital signal processor.

10. The apparatus of claim 8, wherein the data modulation logic includes a sigma-delta modulator.

11. The apparatus of claim 8, wherein the communications medium is a wireless medium.

12. The apparatus of claim 8, wherein the communications medium is a wire line.

13. The apparatus of claim 12, wherein the wire line is energized through a line transformer.

14. The apparatus of claim 13, comprising at least four power switches.

15. The apparatus of claim 14, wherein a first pair of power switches is arranged to drive current in one direction through the line transformer, and a second pair of power switches is arranged to drive current in the opposite direction through the line transformer.

16. The apparatus of claim 15, further comprising first and second filters, the first filter filtering a drive signal produced by the first pair of power switches prior to that drive signal being applied to the line transformer, and the second filter filtering a drive signal produced by the second pair of power switches prior to that drive signal being applied to the line transformer.

17. The apparatus of claims 16, wherein the filters are low-pass filters.

18. The apparatus of claim 15, wherein the first and second pairs of power switches are arranged to cause current to be driven from a first operational voltage supply to a reference voltage supply, further comprising first and second additional power switches arranged to cause current to be driven from a second, higher, operational voltage supply to the reference voltage supply.

19. The apparatus of claim 18, wherein a voltage of the second, higher, operational voltage supply is about twice a voltage of the first operational voltage supply.

20. The apparatus of claim 18, further comprising first and second filters, the first filter filtering a drive signal produced by the first pair of power switches prior to that drive signal being applied to the line transformer, and the second filter filtering a drive signal produced by the second pair of power switches prior to that drive signal being applied to the line transformer.

21. The apparatus of claim 20, wherein the filters are low-pass filters.

22. The apparatus of claim 20, further comprising third and fourth additional power switches arranged to terminate the first and second filters when no current is being driven.

23. The apparatus of claim 22, wherein control of the third and fourth additional power switches is at least partially dependent on a sign bit of a previous sample of the desired communication signal.

24. Circuitry for producing a communications signal, comprising: latches for latching multiple digital signals taken from multiple high-rate digital signal streams representing a desired communications signal; level-shifting circuitry responsive to output signals from the latches for producing multiple level-shifted signals; and multiple power switches responsive to the level-shifted signals for energizing a communications medium to produce the desired communications signal.

25. The apparatus of claim 24, wherein the communications medium is a wire line.

26. The apparatus of claim 25, wherein the wire line is energized through a line transformer.

27. The apparatus of claim 26, comprising at least four power switches.

28. The apparatus of claim 27, wherein a first pair of power switches is arranged to drive current in one direction through the line transformer, and a second pair of power switches is arranged to drive current in the opposite direction through the line transformer.

29. The apparatus of claim 28, wherein the first and second pairs of power switches are arranged to cause current to be driven from a first operational voltage supply to a reference voltage supply, further comprising first and second additional power switches arranged to cause current to be driven from a second, higher, operational voltage supply to the reference voltage supply.

30. The apparatus of claim 29, wherein a voltage of the second, higher, operational voltage supply is about twice a voltage of the first operational voltage supply.

31. The apparatus of claim 29, further comprising terminals for connecting first and second filters, the first filter filtering a drive signal produced by the first pair of power switches prior to that drive signal being applied to the line transformer, and the second filter filtering a drive signal produced by the second pair of power switches prior to that drive signal being applied to the line transformer.

32. The apparatus of claim 31, further comprising third and fourth additional power switches arranged to terminate the first and second filters when no current is being driven.

* * * * *

UNITED STATES PATENT AND TRADEMARK OFFICE
CERTIFICATE OF CORRECTION

PATENT NO. : 6,724,830 B2
DATED : April 20, 2004
INVENTOR(S) : Gary L. Do, Earl W. McCune, Jr. and Wendell B. Sander It is certified that error appears in the above-identified patent and that said Letters Patent is hereby corrected as shown below:

Title page,
*Primary Examiner*, replace "Bohure" with -- Bocure --.

Drawings
FIG. 10, replace "$A_1$" with -- $A_1$' --.

Column 1,
Line 44, replace "$V_{alve}$" with -- $V_{ave}$ --.

Column 6,
Line 23, replace "(A1', B2); (A2', B1')" with -- ($A_1$', $B_2$'); ($A_2$', $B_1$') --.
Line 24, replace "(B1', B2')" with -- ($B_1$', $B_2$') --.

Column 7,
Line 25, replace "A3' and A4'" with -- $A_3$' and $A_4$' --.
Lines 27 and 29, replace "A1' and A2'" with -- $A_1$' and $A_2$' --.
Line 53, replace "B3' and B4'" with -- $B_3$' and $B_4$' --.

Column 8,
Lines 19 and 46, replace "B3'" with -- $B_3$' --.
Lines 20, 23, 24 and 50, replace "B4'" with -- $B_4$' --.
Lines 26 and 43, replace "B3' and B4'" with -- $B_3$' and $B_4$' --.
Line 31, replace "A2' and B2'" with -- $A_2$' and $B_2$' --.
Line 33, replace "A4' and B2'" with -- $A_4$' and $B_2$' --.
Line 39, replace "A2' and A4'" with -- $A_2$' and $A_4$' --.
Line 47, replace "A1' and A3'" with -- $A_1$' and $A_3$' --.

Signed and Sealed this

Sixteenth Day of November, 2004

JON W. DUDAS
*Director of the United States Patent and Trademark Office*